(12) United States Patent
Tajiri et al.

(10) Patent No.: US 6,177,159 B1
(45) Date of Patent: Jan. 23, 2001

(54) COMPOSITE SHEET FOR FOOD CONTAINER

(75) Inventors: Kazuo Tajiri; Masaharu Saito, both of Tokyo (JP)

(73) Assignee: Sumitomo Bakelite Company Limited, Tokyo (JP)

( * ) Notice: Under 35 U.S.C. 154(b), the term of this patent shall be extended for 0 days.

(21) Appl. No.: 08/979,539

(22) Filed: Nov. 26, 1997

(30) Foreign Application Priority Data

Jun. 10, 1996 (JP) .................................................. 8-147636

(51) Int. Cl.[7] .............................. B32B 1/08; B32B 27/36; B32B 27/08; B32B 27/30

(52) U.S. Cl. ...................... 428/35.7; 428/36.6; 428/36.7; 428/36.9; 428/36.91; 428/412; 428/474.4; 428/475.2; 428/475.5; 428/475.8; 428/476.3

(58) Field of Search ................................ 428/34.8, 35.2, 428/35.4, 35.7, 36.6, 36.7, 36.9, 36.91, 412, 474.4, 475.2, 475.5, 475.8, 476.3

(56) References Cited

U.S. PATENT DOCUMENTS

| | | | |
|---|---|---|---|
| 4,654,240 | 3/1987 | Johnston | 428/35 |
| 5,336,549 | 8/1994 | Nishimoto et al. | 428/213 |
| 5,972,447 | * 10/1999 | Hata et al. | 428/35.7 |

FOREIGN PATENT DOCUMENTS

| | | |
|---|---|---|
| 0186154A | 7/1986 | (EP) . |
| 2197254A | 5/1988 | (GB) . |
| 94/19186A | 9/1994 | (WO) . |

OTHER PUBLICATIONS

Database WPI, Section Ch, Week 9651, Class A18, AN 96–513896, JP 08 267 676A, Oct. 15, 1996, abstract.
Patent Abstracts of Japan, vol. 18, No. 616 (M–1710), Nov. 24, 1994, JP 06 238847A, Aug. 30, 1994.
Japanese Kokai JU–A 61('86)–115626.
Japanese Kokai JP–A 60('85)–68938.
Japanese Kokai JP–A 2('90)–204035.
JP–A 9('97)–327896.

* cited by examiner

Primary Examiner—Paul Thibodeau
Assistant Examiner—Holly C Rickman
(74) Attorney, Agent, or Firm—Smith, Gambrell & Russell, LLP

(57) ABSTRACT

Provided is a composite sheet for food containers which comprises (A) an aroma proof resin layer comprising a saturated polyester resin, a polycarbonate resin and a copolymer comprising three components of bisphenol A, diphenyl carbonate and 1,10-decanedicarboxylic acid or a mixture of at least two of these three resins, (B) a polyamide resin layer, (C) a water vapor barrier resin layer, (D) a gas barrier resin layer and (E) a thermoplastic support resin layer, these layers being laminated in succession in order of A-B-C-D-E. This composite sheet for food container has remarkable aroma proof and low-temperature impact resistance with having the performances of synthetic resin containers having gas barrier properties and capable of being subjected to high-temperature sterilization.

16 Claims, 1 Drawing Sheet

COMPOSITE SHEET FOR FOOD CONTAINER

BACKGROUND OF THE INVENTION

The present invention relates to a composite sheet for food containers for containing food or beverage which has excellent sealability, heat resistance, aroma proof and low-temperature impact resistance and which can be subjected to high-temperature sterilization.

Hitherto, as containers or packaging materials for packaging foods which are highly susceptible to oxygen gas without causing deterioration of the foods, synthetic resin containers or packaging materials prepared by the methods called vacuum forming or air-pressure forming from a laminate sheet of at most about 1 mm thick comprising polypropylene/ethylene-vinyl alcohol copolymer/polypropylene have been utilized as disposable containers.

These conventional containers have problems that they are not sufficient in aroma proof and flavor of foods is spoiled. For solving these problems, JU-B-5(1993)-8127 proposes to provide an aroma proof resin layer comprising a saturated polyester resin layer or polycarbonate resin layer as the innermost layer. According to this invention, there is obtained a container which can preserve foods without spoiling flavor by laminating in succession the aroma proof resin layer, a water vapor barrier resin layer, a gas barrier resin layer and a thermoplastic resin layer.

The flavor of foods is deteriorated with oxygen gas, and, besides, the flavor per se is adsorbed (absorbed) into the materials of containers or packaging materials or transmits through containers or the like, and thus the flavor of foods is spoiled. This causes deterioration of quality of contents. It is generally known that saturated polyester resins or polycarbonate resins are high in the effect to preserve the flavor.

The above-mentioned containers are filled with contents, sealed and heat treated in factories and then distributed to shops. Some of the commodities are stored at low temperatures during the stage of this distribution, and even in the case of distribution at room temperature, the temperature becomes considerably low in winter. The conventional containers lower in impact resistance during distribution at low temperatures, and cracks may occur in a part of the container. In this case, if the content is liquid, there is the possibility of the content leaking out of the container. Furthermore, there is the possibility of the content putrefying because gas barrier properties imparted to the container cannot be sufficiently exhibited.

Various proposals have also been made on containers improved in impact resistance at low temperatures, but composite sheets for food containers of high low-temperature impact resistance with having both the preservability and aroma proof of contents have not yet been disclosed.

SUMMARY OF THE INVENTION

The object of the present invention is to provide a composite sheet for food container which has remarkable aroma proof and low-temperature impact resistance with having the performances of synthetic resin containers having gas barrier properties and capable of being subjected to high-temperature sterilization.

The present invention is a composite sheet for food containers which comprises (A) an aroma proof resin layer comprising a saturated polyester resin, a polycarbonate resin and a copolymer comprising three components of bisphenol A, diphenyl carbonate and 1,10-decanedicarboxylic acid (hereinafter referred to as "a three-component copolymer") or a mixture of at least two of these three resins, (B) a polyamide resin layer, (C) a water vapor barrier resin layer, (D) a gas barrier resin layer and (E) a thermoplastic support resin layer, these layers being laminated in succession in order of A-B-C-D-E. If necessary, adhesive layers may be provided between A-B, B-C, C-D and D-C, respectively.

DESCRIPTION OF THE INVENTION

Figure 1:
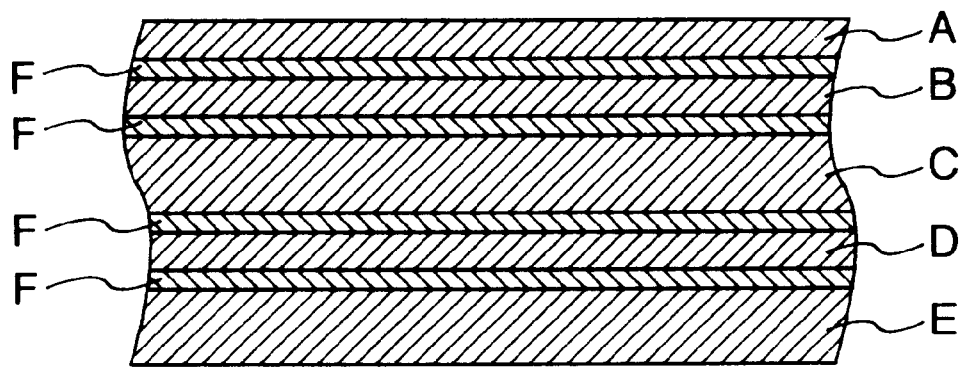
FIG. 1 is a sectional view of one example of the composite sheet according to the present invention.

In the present composite sheet, it is preferred that the polyamide resin layer (B) is a co-condensation resin of 6-nylon and 66-nylon and the relation between thickness $T_B$ of the polyamide resin layer (B) and total thickness $T_T$ of the composite sheet for food containers satisfies $0.01<T_B/T_T<0.08$.

It is preferred that the water vapor barrier resin layer (C) is polypropylene resin, high-density polyethylene resin or polyvinylidene chloride resin or a multilayer resin layer comprising a laminate of polypropylene resin and polyvinylidene chloride resin. Furthermore, water vapor barrier property (according to the test method of JIS-Z0208 at 40° C.×90%RH) of the water vapor barrier resin layer is preferably 1.0 g/m²·24 hr or less.

It is preferred that the oxygen gas barrier resin layer (D) is ethylene-vinyl alcohol copolymer resin with ethylene copolymerization ratio being 20–45% or polyamide obtained by the polycondensation reaction of m-xylylenediamine with adipic acid (hereinafter referred to as MXD6 nylon).

The support resin layer (E) is preferably polypropylene resin.

The present invention is a composite sheet which comprises an aroma proof resin layer comprising a saturated polyester resin, a polycarbonate resin and a three-component copolymer or a resin mixture obtained by melt mixing these resins, an impact resistance imparting layer comprising a polyamide resin, a water vapor barrier resin layer, a gas barrier resin layer and a thermoplastic support resin layer, these layers being laminated in succession. When this sheet is formed into food containers, it is necessary that the aroma proof resin layer is the innermost layer of the containers.

FIG. 1 illustrates one example of the composite sheet of the present invention. The total thickness of the sheet is preferably 500–1200 μm, but this is not critical. In FIG. 1, (A) indicates the aroma proof resin layer which comprises one of polycarbonate, polyethylene terephthalate, polybutylene terephthalate and three-component copolymer or a resin obtained by melt mixing or copolymerizing these resins. Ratio of thickness of this layer to the total thickness of the sheet is desirably 3–15%.

(B) is a polyamide resin layer which is laminated so as to impart impact resistance at low temperatures, and 6 nylon, 6-66 nylon, 6-12 copolymer nylon, and the like are used for this layer. Among them, 6-66 nylon is most preferred from the points of formability into sheet and low-temperature impact resistance. The polyamide resin layer has a function to retain aroma (function of aroma proof) in addition to the function to impart the low-temperature impact resistance, and thus this layer is useful also for the improvement of aroma proof. Furthermore, since the layer has water absorption properties, it also has the function to inhibit deterioration of gas barrier properties of the gas barrier resin layer mentioned below due to absorption of water contained in the content. Ratio of thickness of the polyamide resin layer to the total thickness of the sheet is preferably 1–8%.

(C) is a water vapor barrier resin layer, and polypropylene (PP), polyvinylidenene chloride (PVDC) or high-density polyethylene (HDPE) is used therefor. PP preferably has a melt flow rate of 2.5 or less, and various PPs such as homopolymers, copolymers and random copolymers can be used. Furthermore, polyethylenic polyolefins such as low-density polyethylene (LDPE) and high-density polyethylene (HDPE), can also be melt mixed therewith. The PVDC includes homopolymers, copolymers with acrylic acid, copolymers with polyvinyl chloride (PVC) and the like. The HDPE means here polyethylenes having a specific gravity of 0.93 or more. HDPE may be used alone, but may be melt mixed with some amount of LDPE.

The water vapor barrier property of the water vapor barrier resin layer (C) is preferably 1.0 g/m$^2$·24 hr or less measured by the test method of JIS-Z0208 at 40° C.×90%RH.

As the gas barrier layer (D), polyvinyl alcohol or ethylene-vinyl alcohol copolymer (EVOH) or MXD6 nylon is used. As for EVOH, ethylene copolymerization ratio is preferably 20–45%.

As the support resin layer (E), there may be used various thermoplastic resins. The resins are selected taking into consideration the characteristics such as heat resistance of container, shape retention and formability into container, and preferred are PP and polycarbonate resin. In FIG. 1, (F) indicates an adhesive layer.

Methods for the lamination of these resins include known lamination methods such as co-extrusion method, co-extrusion lamination method, extrusion lamination method and dry lamination method. In order to bond these resins for lamination, adhesives or adhesive resins suitable for respective resins are used, but these may not be used. For the formation of the multilayer sheet into a container, vacuum forming method, air-pressure forming method, vacuum pressure forming method and cold working method are generally employed.

Action of the present invention will be explained. The aroma proof resin layer of the innermost layer has the effect to protect flavor of the content, and furthermore, can stand high-temperature sterilization by suitably selecting the constitution of lid material which seals the container and moreover it can impart easy peelability. The adjacent low-temperature impact resistance imparting layer has the effect to prevent such troubles that the container cracks due to the shock given at the time of delivery and, as a result, gas barrier properties to be possessed cannot be maintained or in the worst case, the content leaks out of the container. Furthermore, as aforementioned, the polyamide resin used here has water absorption properties and thus has also the effect to supplement the effect of the adjacent water vapor barrier layer to prevent transmission of water. Moreover, it has a function to retain aroma of the content and thus has the effect to supplement the aroma proof by being present in adjacent to the innermost aroma proof resin layer.

The water vapor barrier resin layer which is positioned inside the gas barrier resin layer has the effect to prevent deterioration of barrier properties of the gas barrier resin layer caused by absorption of water of the content.

The gas barrier resin layer has the effect to prevent putrefaction and deterioration of the content due to oxygen, namely, the oxygen barrier effect and the effect to prevent transmission and diffusion of the flavor of the content to the outside of the container.

The composite sheet for food containers of the present invention possesses all of the above-mentioned effects with having water vapor barrier properties, gas barrier properties and suitability to high-temperature sterilization of the conventional laminated sheets for containers.

EXAMPLES

The effects of the present invention are explained by the following examples. Table 1 shows constructions of multilayer sheets of the examples according to the present invention and comparative multilayer sheets. These multilayer sheets were prepared by co-extrusion method. These multilayer sheets were formed into containers having a bore diameter of 80 mmφ, a height of 50 mm and a bottom diameter of 40 mmφ by a vacuum forming machine of indirect heating type. These containers were filled with orange juice or curry sauce as contents. The former was hot-filled at 60° C. and the latter was subjected to retort sterilization at 120° C. for 30 minutes after filling, and thereafter, they were stored for one month at room temperature. They were compared on preservation properties and flavor suitability. Furthermore, impact resistance was evaluated by drop test for the containers filled with water and sealed. The results are shown in Table 2.

TABLE 1

|  | Aroina proof resin layer | Impact resistance imparting layer | Water vapor barrier layer | Gas barrier layer | Outer layer |
| --- | --- | --- | --- | --- | --- |
| Example 1 | PC(50) | 6-66Ny(10) | PP1(300) | EVOH(40) | PP2(400) |
| Example 2 | PET(50) | 6-66Ny(10) | PP1(300) | EVOH(40) | PP1(400) |
| Example 3 | Three-component copolymer (50) | 6-66Ny(10) | PP1(30) | EVOH(40) | PP2(400) |
| Example 4 | Three-component copolymer (50) | 6-66Ny(10) | PP1(30) | MXNy(40) | PP2(400) |
| Comparative Example 1 | — | — | PP1(300) | EVOH(40) | PP1(400) |
| Comparative Example 2 | PC(50) | — | PP1(300) | EVOH(40) | PP2(400) |
| Comparative Example 3 | PP3(50) | — | PP1(300) | EVOH(40) | PP2(400) |

Thickness (μm) of the layers is shown in

PC: Polycarbonate 6-66Ny: 6-66 nylon

PP1: Polypropylene homopolymer

PP2: Polypropylene comopolymer

PP3: Low-bromination random copolymer polypropylene

EVOH: Ethylene-vinyl alcohol copolymer

PET: Polyethylene terephthalate

Three-component copolymer: Bisphenol A : diphenyl carbonate : 1,10-decanedicarboxylic acid=91:91:9

MXNy: MXD6 nylon

TABLE 2

| | Flavor retention | | Preservability | | Low-temperature impact resistance | |
|---|---|---|---|---|---|---|
| | Orange juice | Curry sauce | Orange juice | Curry sauce | Orange Juice | Curry sauce |
| Example 1 | o | o | o | o | o | o |
| Example 2 | o | o | o | o | o | o |
| Example 3 | o | o | o | o | o | o |
| Example 4 | o | o | o | o | o | o |
| Comparative Example 1 | x | x | x | x | x | Δ |
| Comparative Example 2 | o | o | o | Δ | Δ | Δ |
| Comparative Example 3 | Δ | Δ | x | x | x | Δ |

Flavor:

(Evaluation on orange juice)

Amount of limonene (a component of orange juice) adsorbed to the innermost layer was measured.

o: Substantially no limonene was adsorbed.

Δ: A slight amount of limonene was adsorbed.

x: A large amount of limonene was adsorbed.

(Evaluation on curry sauce)

Tasting test was conducted on the content after stored for 1 month.

o: There was no change in flavor.

Δ: There was a slight change in flavor.

x: There was a change in flavor. (Odor of plastics was developed.)

Preservability: Evaluation after storage for 1 month.

(Evaluation on orange juice)

o: Decrease in content of vitamin C was a little and it had a good taste.

Δ: Decrease in content of vitamin C was great and change was seen.

(Evaluation on curry sauce)

o: Oxidation of oil component was little and the curry sauce was fit for eating.

Δ: The curry sauce was fit for eating, but oxidation of oil component was recognized.

x: Oxidation of oil component was great and the curry sauce had rancid odor and was not fit for eating.

Low-temperature impact resistance:

The containers were filled with water in an amount of 80% and sealed, and then subjected to retort treatment at 120° C. for 30 minutes. Twenty containers were put in one case and stored under sufficient cooling at −5° C. Then, the case was taken out and immediately dropped from a height of 80 cm. The number of broken containers was counted.

o: The number of broken containers: 0

Δ: The number of broken containers: 1–5 x: The number of broken containers: 6 or more

The food containers made using the composite sheets for food containers according to the present invention cause no change in flavor of contents and are excellent in low-temperature impact resistance as compared with conventional synthetic resin multilayer containers.

What is claimed is:

1. A composite sheet for food containers comprising:
   (A) an aroma proof resin layer comprising a member from the group consisting of a saturated polyester resin, a polycarbonate resin, a copolymer comprising the three components of bisphenol A, diphenyl carbonate and 1,10-decanedicarboxylic acid and a mixture of at least two of these resins, (B) a polyamide resin layer, (C) a water vapor barrier resin layer, (D) a gas barrier resin layer and (E) a thermoplastic support resin layer, these layers being laminated in succession in the order of A-B-C-D-E, wherein layers A and E contain different resins, and layers B and D contain different resins.

2. The composite sheet for food containers according to claim 1, wherein the polyamide resin layer (B) is a co-condensation resin of 6-nylon and 66-nylon.

3. The composite sheet for food containers according to claim 1, wherein the ratio of the thickness $T_B$ of the polyamide resin layer (B) to the total thickness $T_T$ of the composite sheet is greater than 0.01 and less than 0.08.

4. The composite sheet for food containers according to claim 1, wherein the water vapor barrier resin layer (C) is polypropylene resin, high-density polyethylene resin or polyvinylidene chloride resin.

5. The composite sheet for food containers according to claim 1, wherein the water vapor barrier resin layer (C) is a multilayer resin comprising a laminate of polypropylene resin and polyvinylidene chloride resin.

6. The composite sheet for food containers according to claim 1, wherein the water vapor barrier resin layer (C) has a water vapor barrier property of 1.0 g/m$^2$·24 hr or less according to the test method of JIS-Z0208 at 40° C.×90%RH.

7. The composite sheet for food containers according to claim 1, wherein the gas barrier resin layer (D) is an ethylene-vinyl alcohol copolymer resin and copolymerization ratio of ethylene is 20–45%.

8. The composite sheet for food containers according to claim 1, wherein the gas barrier resin layer (D) is polyamide obtained by the polycondensation reaction of m-xylylenediamine with adipic acid.

9. The composite sheet for food containers according to claim 1, wherein the support layer (E) is polypropylene resin.

10. A sealed container obtained by forming the composite sheet of claim 1 into a container with (A) as an innermost layer and sealing the resulting container with a lid having gas barrier properties.

11. The composite sheet for food containers according to claim 1, wherein the saturated polyester resin is a member selected from the group consisting of polyethylene terephthalate and polybutylene terephthalate.

12. The composite sheet for food containers according to claim 4 and further comprising a low density polyethylene or a high density polyethylene which is melt mixed with the water vapor barrier resin layer.

13. The composite sheet for food containers according to claim 4, wherein the polyvinylidene chloride resin is a copolymer with acrylic acid or a copolymer with vinyl chloride.

14. The composite sheet for food containers according to claim 1, wherein the aroma proof resin layer is a polycarbonate, the polyamide resin layer is a cocondensation resin of 6-nylon, 66-nylon, the water vapor barrier resin layer is polypropylene homopolymer, the gas barrier layer is ethylene-vinyl alcohol copolymer and the thermoplastic support resin layer is a propylene copolymer.

15. The composite sheet for food containers according to claim 1, wherein the three component copolymer of bisphenol A, diphenol carbonate and 1,10-decanedicarboxylic acid is in the ratio of 91:91:9.

16. An unsealed container obtained by forming a composite sheet according to claim 1 into a container wherein the aroma proof resin layer is the inner most layer.

* * * * *